US008799518B2

(12) United States Patent
Kinra

(10) Patent No.: US 8,799,518 B2
(45) Date of Patent: Aug. 5, 2014

(54) PROCESS FOR SELECTING AN AUTHORITATIVE NAME SERVER

(75) Inventor: Rohit Kinra, Washington, DC (US)

(73) Assignee: Verisign, Inc., Reston, VA (US)

( * ) Notice: Subject to any disclaimer, the term of this patent is extended or adjusted under 35 U.S.C. 154(b) by 183 days.

(21) Appl. No.: 13/439,189

(22) Filed: Apr. 4, 2012

(65) Prior Publication Data

US 2013/0268649 A1    Oct. 10, 2013

(51) Int. Cl.
*G06F 15/16* (2006.01)

(52) U.S. Cl.
USPC ............................ 709/249; 709/203; 709/224

(58) Field of Classification Search
CPC ......... H04L 65/60; H04L 67/01; H04L 69/14; G06F 17/30194
USPC .................. 709/203, 217, 219, 223, 249, 224
See application file for complete search history.

(56) References Cited

U.S. PATENT DOCUMENTS

| | | | |
|---|---|---|---|
| 6,115,752 A | 9/2000 | Chauhan | |
| 6,496,850 B1* | 12/2002 | Bowman-Amuah | 709/203 |
| 7,086,061 B1 | 8/2006 | Joshi et al. | |
| 7,461,147 B1 | 12/2008 | Mowat et al. | |
| 7,734,683 B1 | 6/2010 | Bergenwall et al. | |
| 7,886,023 B1 | 2/2011 | Johnson | |
| 2003/0046369 A1* | 3/2003 | Sim et al. | 709/220 |
| 2004/0039798 A1 | 2/2004 | Hotz et al. | |
| 2005/0004927 A1* | 1/2005 | Singer | 707/100 |
| 2007/0198739 A1* | 8/2007 | Jennings et al. | 709/231 |
| 2008/0235383 A1 | 9/2008 | Schneider | |
| 2009/0164661 A1 | 6/2009 | Kim et al. | |
| 2009/0222583 A1 | 9/2009 | Josefsberg et al. | |
| 2010/0257266 A1 | 10/2010 | Holmes et al. | |
| 2010/0274970 A1 | 10/2010 | Treuhaft et al. | |

OTHER PUBLICATIONS

Detecting Hidden Anomalies in DNS Communication by Mikle Ondrej et al. Oct. 2011.*
Building a Dynamic Reputation System for DNS. Antonakakis, Manos, et al. Published in the Proceedings of the 19th USENIX Security Symposium, Aug. 2010, pp. 273-289.
Detecting Hidden Anomalies in DNS Communication. Mikle, Ondrej, et al. Presented at DNS EASY 2011 Workshop, Oct. 2011.
King: Estimating Latency between Arbitrary Internet End Hosts. Gummadi, Krishna, et al. Published in the Proceedings of the 2nd ACM SIGCOMM Workshop on Internet Measurement, Nov. 2002, pp. 5-18.

* cited by examiner

*Primary Examiner* — Frantz Jean
(74) *Attorney, Agent, or Firm* — MH2 Technology Law Group, LLP

(57) ABSTRACT

Methods and systems for intelligently choosing an authoritative name server from among a group of name servers for resolving Domain Name System requests. Systems and methods are provided that enable choosing of a first server associated with and/or operated by a first service provider based on a first measurement associated with that first server. The systems and methods further comprise requesting first data from that first server, determining that the first server is unresponsive, and choosing a second server. The second server is chosen based on a second measurement, and chosen contingent on it being associated with and/or operated by to a different service provider than that associated with the first server. The systems and methods then comprise requesting second data from the second server.

20 Claims, 10 Drawing Sheets

PROCESS FOR SELECTING AN AUTHORITATIVE NAME SERVER

TECHNICAL FIELD

Example embodiments disclosed herein relate generally to methods for intelligently choosing a name server from among a group of name servers for resolving Domain Name System requests. The embodiments disclosed are useful in, for example, quickly resolving these requests when certain providers of these name servers are unreachable, unavailable, or do not respond in an appropriate amount of time.

BACKGROUND

The Internet is arguably one of the most important inventions of the past 100 years. It enables a user of a computer system to identify and communicate with millions of other users of computer systems located around the world. Computers that use the Internet each have their own Internet Protocol Address (an "IP Address"). These unique IP Addresses are a series of numbers—for example, 65.207.2.2—and enable users on one computer to request data from another computer. One common application of IP addresses is for requesting a webpage from a web server associated with the IP address.

IP Addresses, however, can be cumbersome for people to remember. Thus, an essential part of the Internet became the Domain Name System ("DNS"). Its primary purpose is to translate user-friendly domain names to the Internet Protocol ("IP") addresses used by devices connected to the Internet. This system enables a user to enter a word-based website address (known as a "Domain Name")—such as verisign.com—and access the computer whose IP Address is associated with it. Ultimately, however, a user does not access a website using a domain name alone because the user's web browser will translate the domain name into an IP Address. Thus, in the end, the IP Address is the only identifier that enables users to access websites. Servers called Authoritative Name Servers ("name servers") form a major part of the DNS infrastructure that allows users to ask for the IP Address via a domain name. The Name Servers will receive a user request containing a domain name, determine the IP Address that corresponds to the domain name, and send the IP Address back to the user. The user can then access the website using the IP Address. A Service Provider sometimes will operate multiple Name Servers in order to deliver IP Addresses to requesting users more quickly.

The approach of the prior art in contacting an authoritative name server is to contact the next-most-responsive authoritative name server. Many times, this next-most-responsive authoritative name server will be operated by the same service provider. Thus, for example, if one service provider provides 90% of all name servers, and all of that service provider's name servers are unreachable, then a high percentage of a user's attempts to resolve a domain name will fail. This can waste significant time because such a method will wait for multiple requests to fail before moving onto another server.

Thus, a problem can arise when a Name Server is slow, unresponsive, inaccessible, or is otherwise unusable because users will not be able to learn the IP Address of a website they wish to access. If their preferred name server is not responsive, the user will have to rely upon another name server for that information. Furthermore, if a Service Provider runs multiple name servers and the Service Provider itself is experiencing a network outage, then a user sending requests to other name servers operated by that Service Provider will similarly fail and further delay a user's attempt to resolve a domain name to an IP Address.

Accordingly, a need exists for an improved method of choosing a Name Server, leading to a more efficient and reliable Domain Name System.

DESCRIPTION OF EXEMPLARY EMBODIMENTS

Figure 1:
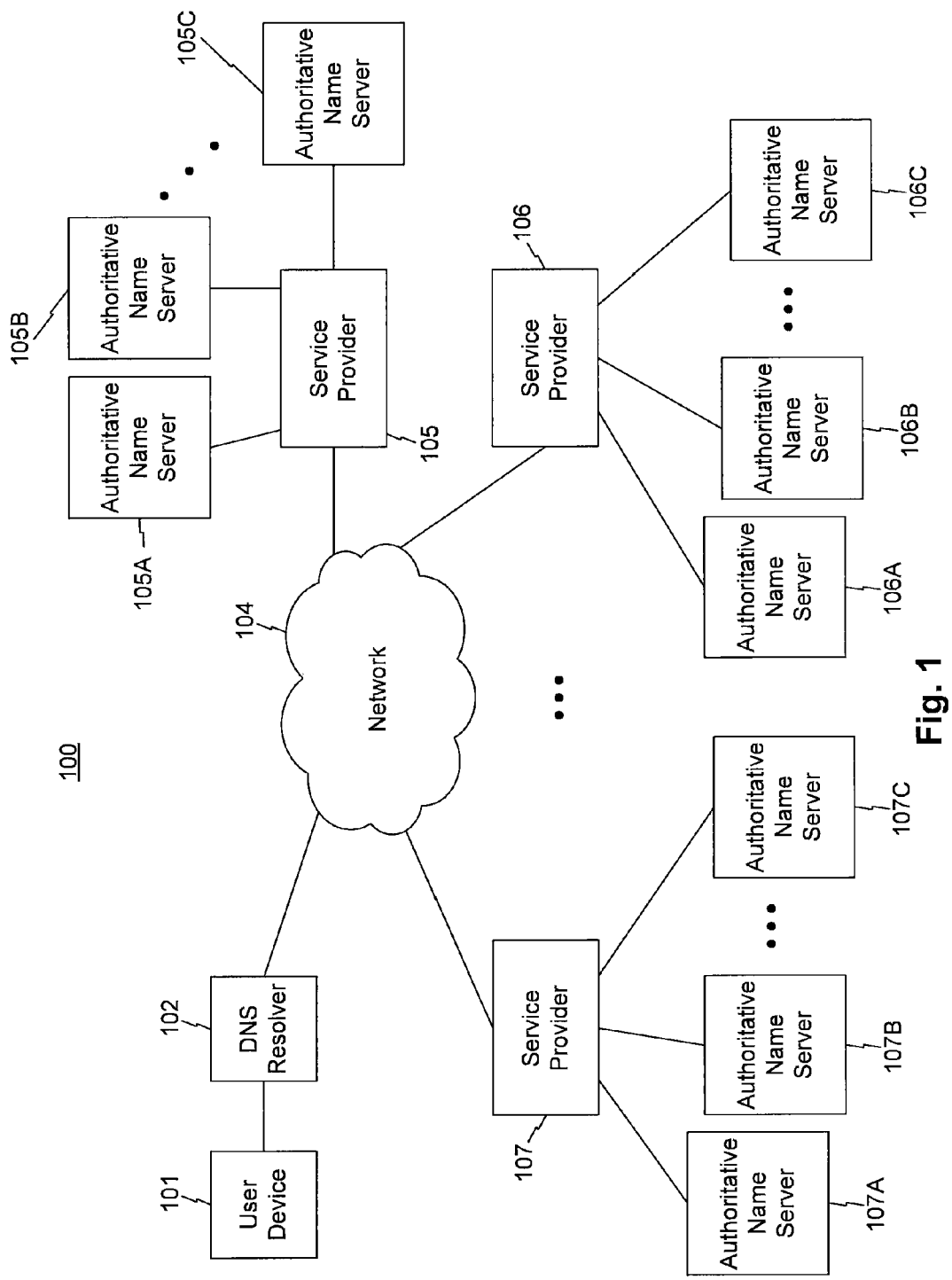
FIG. 1 is an exemplary network layout, consistent with embodiments described herein.

The present disclosure relates to efficiently choosing authoritative name servers for resolving domain name requests. A user will attempt to access another computer with a domain name, by requesting the IP Address through a DNS resolver. In some embodiments, this DNS resolver will be a recursive name server. When receiving a DNS request—that is, a "DNS query"—from a user, the recursive server will attempt to deliver the IP address corresponding to the domain name in the request to the user. If the DNS Resolver has a current record which associates the domain name to the IP Address, then the DNS Resolver will simply send the IP Address to the user. On the other hand, if the record for the domain name has reached the end of its "time to live," the DNS resolver will contact an authoritative name server to obtain an updated record.

Reference will be made below in detail to various embodiments, examples of which are illustrated in the accompanying drawings. Wherever possible, the same reference numbers will be used throughout the drawings to refer to the same or like parts.

Example embodiments described herein are used for resolving DNS requests in an efficient manner which can avoid high latency, slow response time, servers being unreachable, and other network problems.

In one embodiment, a method is provided that comprises choosing a first server associated with and/or operated by a first service provider based on a first measurement associated with that first server. The method further comprises requesting first data from that first server, determining that the first server is unresponsive, and choosing a second server. The second server is chosen based on a second measurement, and chosen contingent on it being associated with and/or operated by a different service provider than that associated with the first server. The method further comprises requesting second data from the second server.

In another embodiment, an electronic device is provided that comprises a memory, a network device, and a processor. The electronic device is configured to choose a first server associated with a first service provider, based on a first measurement stored in the memory and associated with the first server. The electronic device is further configured to, using the network device, request first data from the first server. In response to requesting the first data, the electronic device is configured to determine that the first server is unresponsive, choose a second server based on a second measurement stored in the memory and associated with the second server, the second server being associated with a second service provider different from the first service provider; and then request second data from the second server using the network device.

In another embodiment, a computer-readable medium is provided that, when executed on a computer, performs a method. The method comprises choosing a first server associated with and/or operated by a first service provider based on a first measurement associated with that first server. The method further comprises requesting first data from that first server, determining that the first server is unresponsive, and choosing a second server. The second server is chosen based on a second measurement, and chosen contingent on it being associated with and/or operated by a different service provider than that associated with the first server. The method further comprises requesting second data from the second server.

These example embodiments, as well as those described below, permit the quick and efficient determination of IP Addresses using name servers that are more likely to be available to respond to DNS queries; that is, to provide a "DNS resolution."

FIG. 1 is an exemplary network layout 100 for use with the methods and systems described herein. User Device 101 may represent any type of device that connects to Network 104; for example, a personal computer, tablet PC, cellular telephone, Personal Digital Assistant (PDA), and the like. User Device 101 has a connection with at least one DNS Resolver 102—in some embodiments, a recursive name server—through either a wired, wireless, or other type of network connection. In some embodiments, DNS Resolver 102 may be part of User Device 101; in other embodiments, DNS Resolver 102 may be a separate device, and may also be located in the same location or in a different location as User Device 101.

Network 104 is, in some embodiments, the Internet, though it may also be another similar network. In some embodiments, User Device 101 may connect to Network 104 independently of DNS Resolver 102; in other embodiments, User Device 101 may connect to Network 104 through the same connection as DNS Resolver 102.

Service Providers 105, 106, and 107, are also all connected to Network 104. Each Service Provider—of which Service Providers 105, 106, and 107 are merely exemplary—operates or is otherwise associated with, a plurality of Authoritative Name Servers ("name servers"). For example, Service Provider 105 may be associated with Authoritative Name Servers 105A-105C.

What constitutes a determination that Authoritative Name Servers are "associated with" the same Service Provider includes, for example, any or all of:

a. the Authoritative Name Servers being operated by the same Service Provider,
b. the Authoritative Name Servers having identical domain names (e.g. ns1.ABC.com and ns3.ABC.net would be associated with the same Service Provider),
c. the Authoritative Name Servers having identical top-level domains (TLDs) (e.g. ns3.ABC.com and ns2.BCD.com would be associated with the same service provider),
d. the Authoritative Name Servers having identical TLDs and identical domain names (e.g. ns3.ABC.com and ns2.BCD.com would not be associated with the same service provider, but ns3.ABC.com and ns6.ABC.com would be associated with the same service provider),
e. the existence of a business association between the entities operating the two Authoritative Name Servers (e.g. a partnership, service contract, or peering agreement), and
f. the existence of association data indicating an association between the two Authoritative Name Servers.

In some embodiments, Authoritative Name Servers 105A-105C (as well as 106A-106C and 107A-107C) are connected to Network 104 through their respective Service Providers. In other embodiments, any of these Authoritative Name Servers are connected to Network 104 independently of the connections used by their associated Service Providers or other Authoritative Name Servers from the same Service Provider. For example, Service Provider 105 may have a first connection to Network 104 that it shares with Authoritative Name Servers 105B and 105C, but Authoritative Name Server 105A may be connected to Network 104 through a second connection—though it is still associated with Service Provider 105.

The layout in FIG. 1 is thus logical, physical, or logical and physical in nature. In particular, the number of each unit represented in FIG. 1—especially for the Service Providers 105, 106, and 107, and their associated Authoritative Name Servers—is not controlling; the invention may have any number of Service Providers, Authoritative Name Servers, DNS Resolvers, and User Devices.

Figure 2:
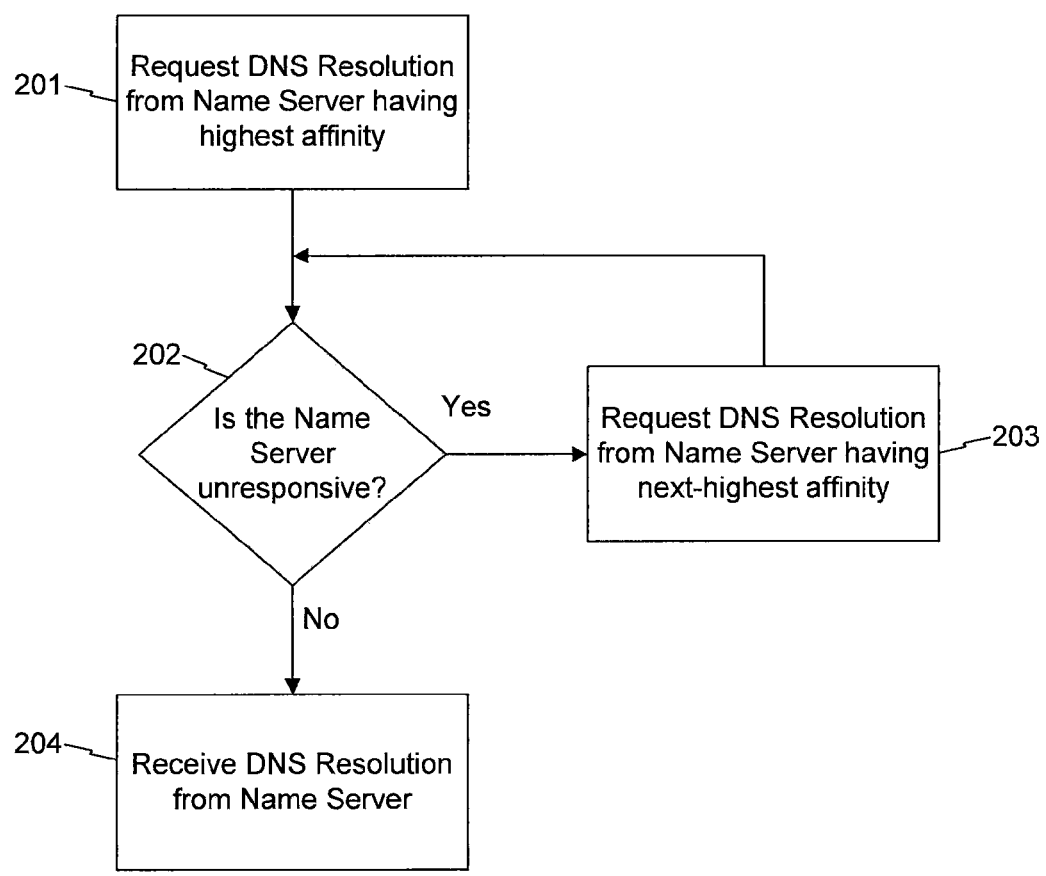
FIG. 2 shows a method of making a DNS request disclosed by the prior art.

FIG. 2 shows a method 200 of requesting a DNS resolution practiced by the prior art. In block 201, User Device 101 and/or DNS Resolver 102 will send a DNS Request to a name server to certain name servers based on the lowest average response times from those name servers. Thus, when attempting to retrieve a particular IP Address associated with www.example.com, User Device 101 will send a DNS query to a name server that it has received the most prompt replies from in the past. In block 202, a determination is made as to whether the name server is unresponsive based on whether the name server does not respond within a predetermined period of time. If the name server responds within a predetermined period of time, the method will continue to block 204, where User Device 101 and/or DNS Resolver 102 will receive the DNS resolution from the name server. If, however, the server is determined to be unresponsive, then the method will proceed to block 203 and generate a new DNS Request for the same domain name to the name server having the next-lowest average response time with User Device 101 and/or DNS Resolver 102, which is usually operated by the same Service Provider that operates the unresponsive name server. This process continues until a name server responds to the DNS Request, as in block 204, or until all possible name servers are tried. As mentioned previously, this approach suffers multiple disadvantages.

Figure 3A:
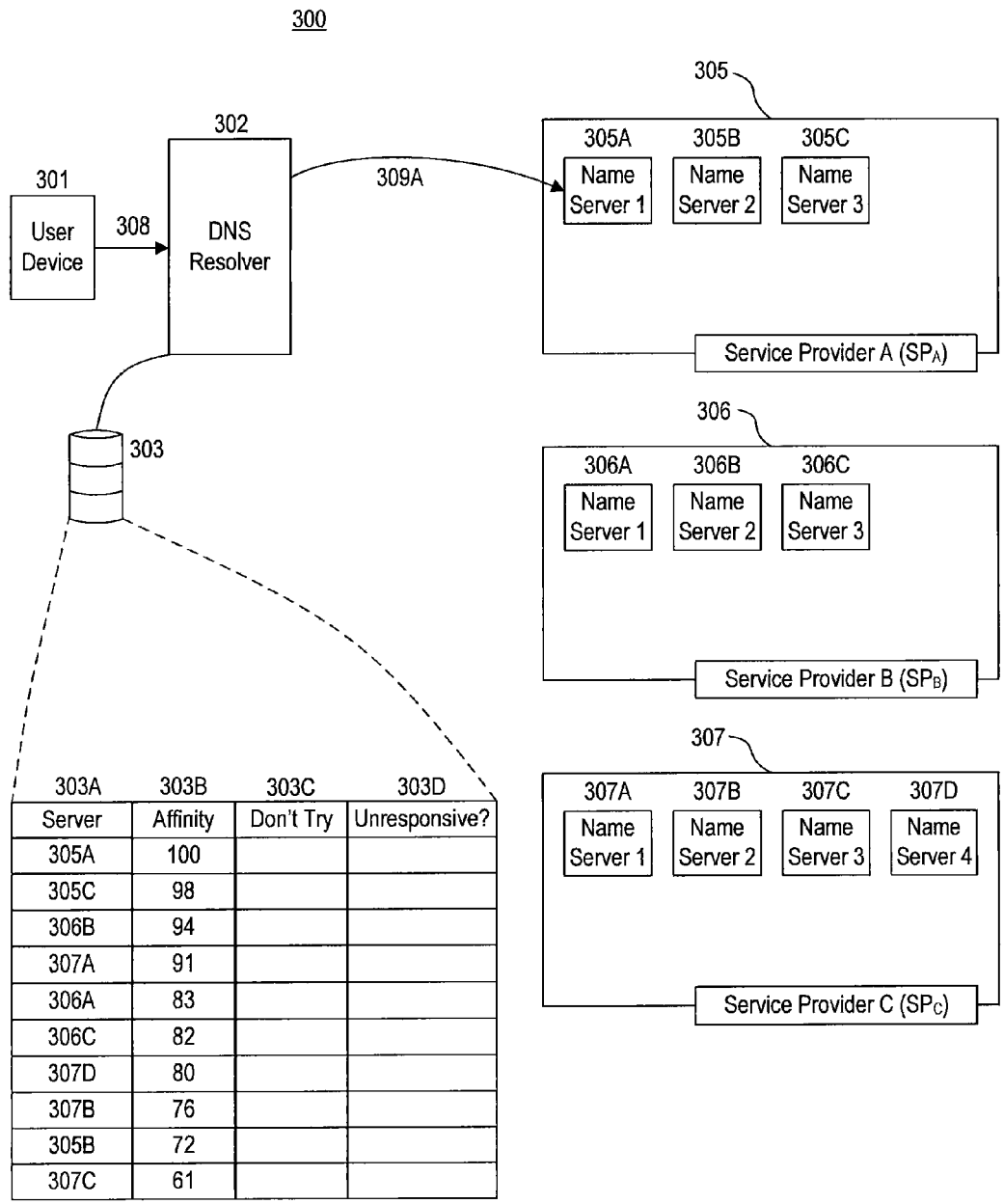
FIG. 3A shows an example step in a process of making a DNS request, consistent with embodiments disclosed herein.

FIG. 3A shows an example step in a process of making a DNS request, consistent with embodiments of the inventive systems and methods. User Device 301 will make a request 308 to DNS Resolver 302. In some embodiments, request 308 will be in the form of a DNS query, requesting an IP Address that corresponds to a particular domain name. Request 308 is received by DNS Resolver 302, and DNS Resolver 302 will determine a first server to contact in order to resolve this request. In some embodiments, DNS Resolver 302 may consult a database 303 to determine the first name server to use in order to resolve this request. In other embodiments, DNS Resolver 302 may consult storage local to DNS Resolver 302 to determine the first name server to use in order to resolve this request.

In some embodiments, database 303 may contain information concerning a plurality of Name Servers as reflected in column 303A, information reflected in column 303B concerning the affinity that User Device 101 and/or DNS Resolver 302 has with each name server, information reflected in column 303C concerning whether or not each name server should be requested to provide a response to a DNS request, and information reflected in column 303D concerning whether the name server was unresponsive on the last attempt to obtain information from it. For purposes of brevity, column 303A lists the identifiers used by the exemplary name servers of FIGS. 3A-3D; however, the identifier reflected in database 303 may be of any type, including but not limited to an IP address for the server, a Fully-Qualified Domain Name (FQDN) for the server, or any other identifier capable of identifying a name server. In other embodiments, the information concerning a plurality of Name Servers reflected in column 303A-D may be contained in an in-memory table, table stored on a computer-readable medium, text file, or the like, found in storage local to DNS Resolver 302.

In some embodiments, DNS Resolver 302 will choose the name server with the highest affinity 303B among all name servers stored in database 303. This "affinity" measurement may be based on, for example: geographic location of the name server, the interactions that the user's device has had in the past with the name server, statistics concerning that name server (e.g. average response time, average uptime, number of past failed responses, and the like), round-trip time between the name server and User Device 101, the authoritative name server's bandwidth, time between past requests by User Device 101 and the name server, and other measurements, metrics, and statistics. This affinity measurement may also be based on particular commercial arrangements, such as service or contractual arrangements between User Device 101, DNS Resolver 102, and/or the service provider that operates or associated with the name server.

DNS Resolver 302 will then attempt to resolve the DNS query via the server with the highest affinity. In exemplary FIG. 3A, DNS Resolver 302 will determine that Name Server 305A has the highest affinity and should be used to resolve the DNS query from User Device 101. Service Provider A ($SP_A$) 305 operates Name Server 305A. Thus, DNS Resolver 302 will forward the DNS Request to Name Server 305A as DNS request 309A.

Figure 3B:
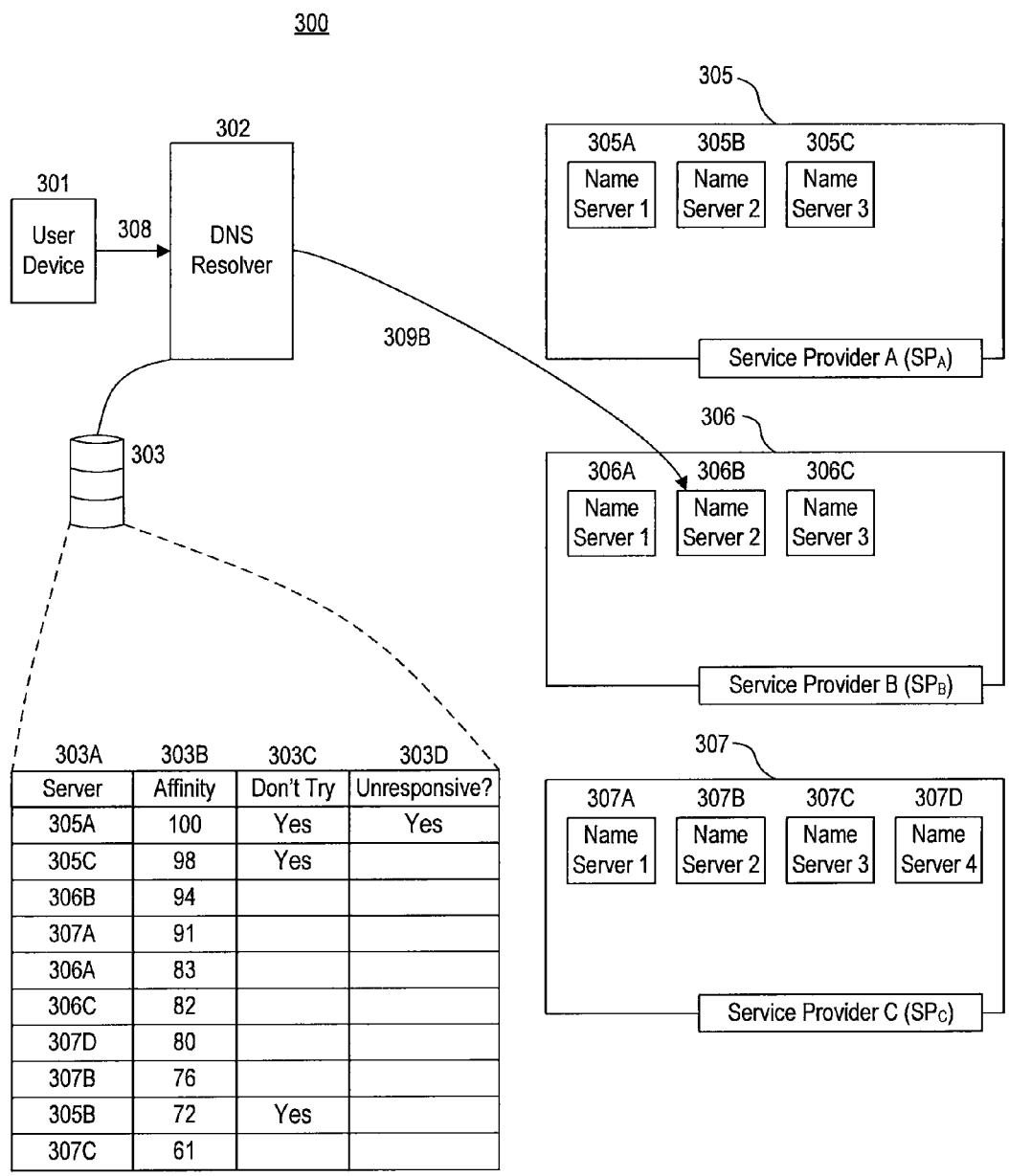
FIG. 3B shows another example step in a process of making a DNS request, consistent with embodiments disclosed herein.

FIG. 3B shows an exemplary next step in a process of making a DNS request, consistent with disclosed embodiments. In this exemplary step, DNS Resolver 302 determines that Name Server 305A is unresponsive. A name server may be determined as "unresponsive" if, for example, the name server does not respond within a predetermined period of time, is not reachable by User Device 301 or DNS Resolver 302, is experiencing a technical, physical, or logical network problem, or the like. At that point, DNS Resolver 302 will make changes to database 303 to signify that Name Server 305A is not responsive. In some embodiments, the change made to database 303 can be a simple piece of data indicating that Name Server 305A is unresponsive. In other embodiments, the data may include the date and time of the request that caused the Name Server 305A to be determined as unresponsive or the like. This change would be made, for example, to column 303D, such that any name server having data in this column would not be tried again because it was unresponsive to the DNS request. In most situations, this would not be a permanent determination, and such name servers could easily be tried in the future by resetting the change made in column 303D. In exemplary FIGS. 3B-3D, the presence of data in column 303D is represented by "Yes."

DNS Resolver 302 may also make changes to database 303 to signify that all of the servers operated by $SP_A$ 305—that is, Name Servers 305A, 305B, and 305C—are determined unlikely respond to a DNS request and should thus not be relied upon to answer a DNS request. This change may be made to exemplary column 303C, such that, for example, any name server having data in this column would not be tried again because at least one other server operated by or associated with the same service provider was unresponsive to a DNS request. In some embodiments, the change made to database 303 may be a simple piece of data indicating that Name Server 305A is unresponsive. In other embodiments, database 303 may include more data, such as the date and time of the request that caused the Name Server 305A to be determined as unresponsive or the like. This may represent a "soft" determination that the Service Provider is having problems. In most situations, this would not be a permanent determination, and these servers may be tried in the future by resetting the change in column 303C. In exemplary FIGS. 3B-3D, the presence of data in column 303C is also represented by "Yes."

DNS Resolver 302 will then forward the DNS request to the name server having the next-highest affinity in column 303B, wherein such a name server is not marked as "don't try" in column 303C or "unresponsive" in column 303D. In exemplary FIG. 3B, Name Server 306B satisfies these rules, because all of Name Servers 305A-305C have been marked as "don't try" in column 303C, and Name Server 305A has been marked as "unresponsive." Thus, DNS Resolver 302 will forward the DNS Request to Name Server 306B as DNS request 309B.

Figure 3C:
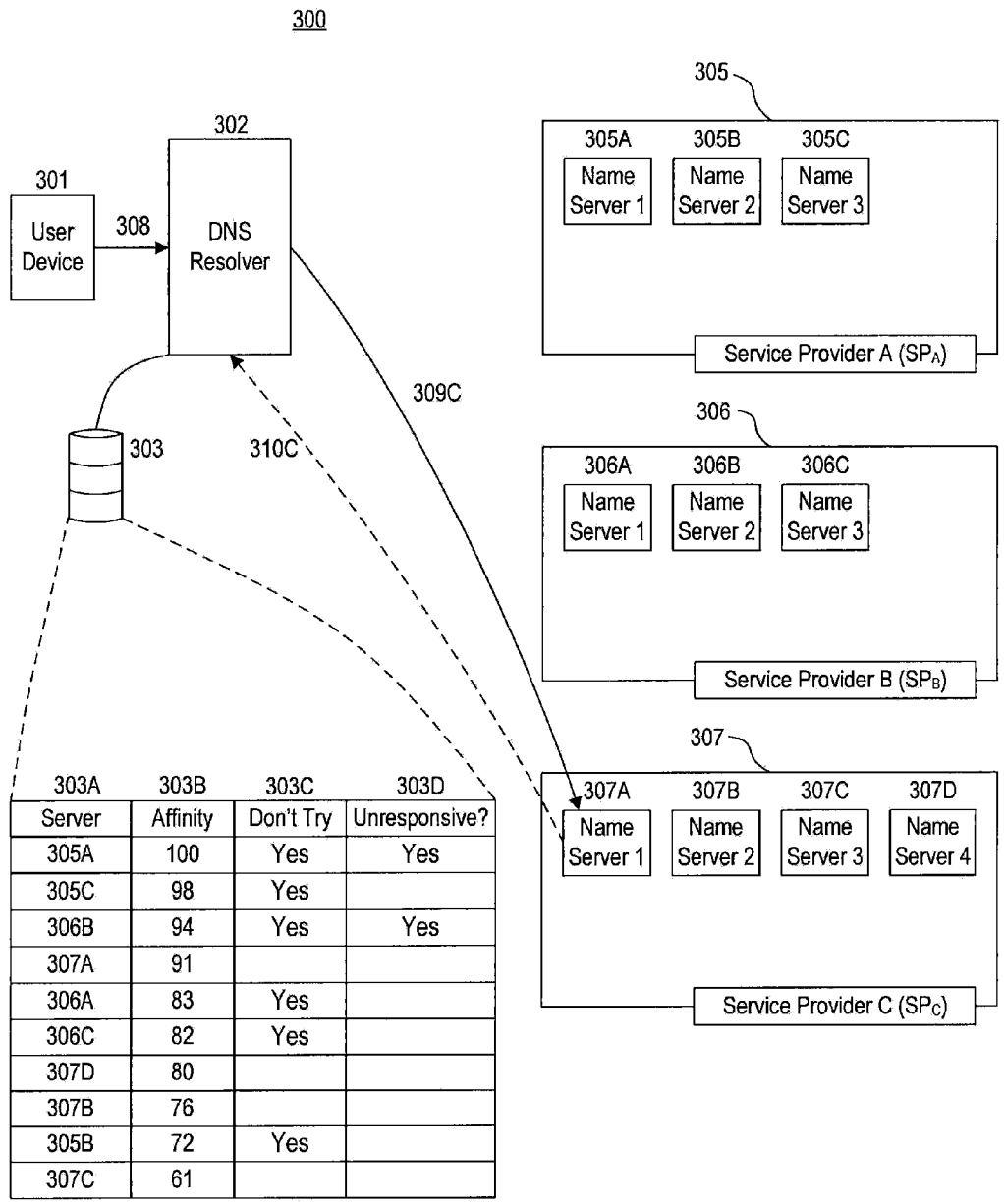
FIG. 3C shows another example step in a process of making a DNS request, consistent with embodiments disclosed herein.

FIG. 3C shows an exemplary next step in a process of making a DNS request, consistent with disclosed embodiments. In this exemplary step, DNS Resolver 302 determines, such as by the operation described in FIG. 3B, that Name Server 306B is unresponsive. Similar to the steps described in FIG. 3B, DNS Resolver 302 may mark all of Name Servers 306A, 306B, and 306C as "don't try" in column 303C, and may also mark Name Server 306B as "unresponsive" in column 303D. DNS Resolver may then, as above, forward the DNS request to the name server having the next-highest affinity in column 303B. In exemplary FIG. 3C, Name Server 307A satisfies these rules, it represents the Name Server with the highest affinity ranking that has not been marked as "don't try" or "unresponsive." Thus, DNS Resolver 302 will forward the DNS Request to Name Server 307A as DNS request 309C.

Figure 3D:
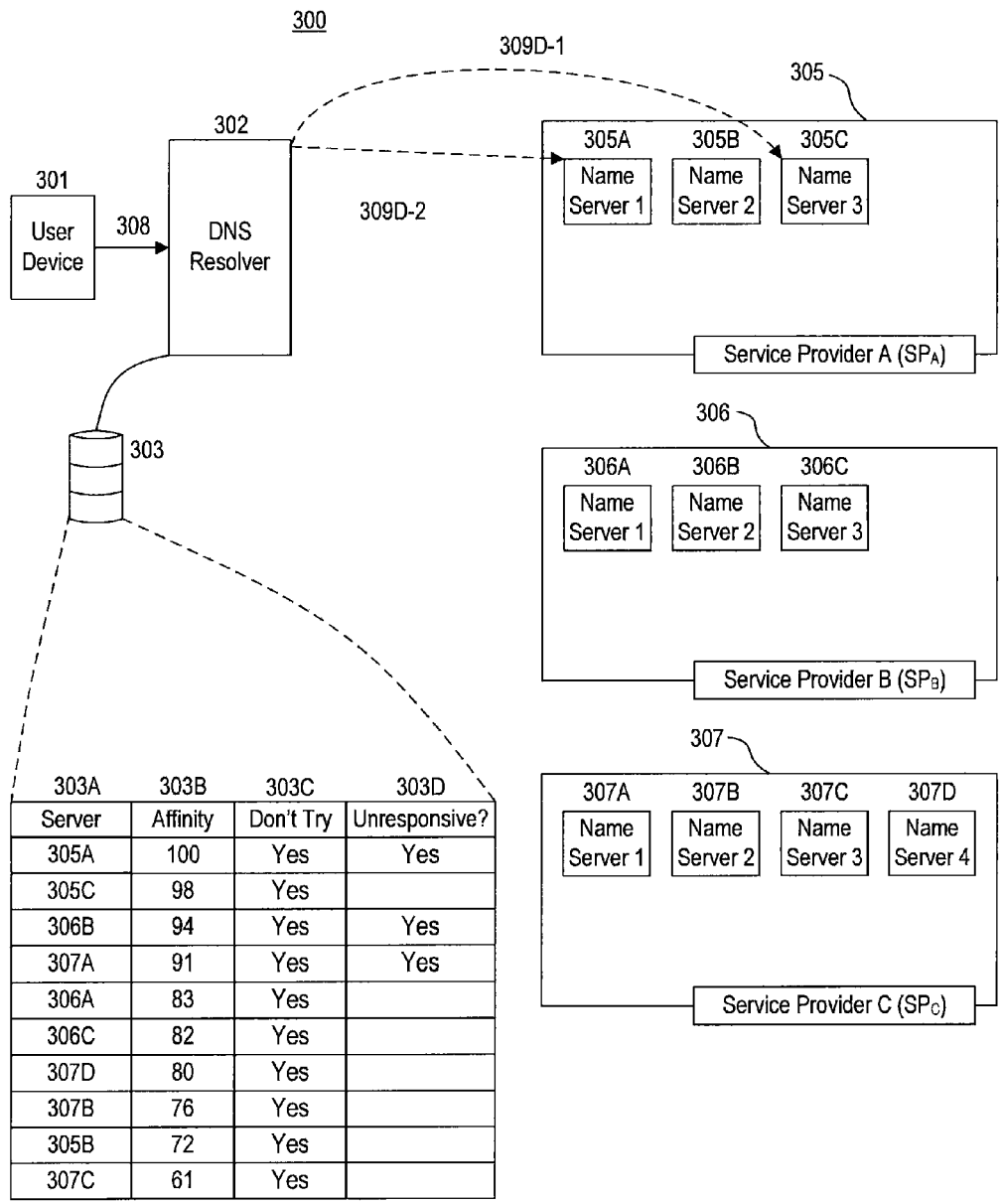
FIG. 3D shows another example step in a process of making a DNS request, consistent with embodiments disclosed herein.

FIG. 3D shows an exemplary next step in a process of making a DNS request, consistent with disclosed embodiments. In this exemplary step, DNS Resolver 302 determines that Name Server 307A is responsive by an operation such as that reflected in FIG. 3C, when it receives a Response to DNS Request (represented as Response 310C). User Device 101 then receives the Response 310C and uses the information in Response 310C (for example, an IP Address) to access a remote computer.

On the other hand, if Name Server 307A is also found to be unresponsive, DNS Resolver 302 may then mark all of Name Servers 307A, 307B, 307C, and 307D as "don't try" in column 303C, and will mark Name Server 307A as "unresponsive" in column 303D. The DNS Resolver 302 then finds that all of the name servers in database 303 have been marked as "don't try," because one server from each service provider has been unresponsive.

In situations where all name servers are marked as "don't try", some embodiments of FIG. 3D disclose DNS Resolver 302 determining the name server which has the highest affinity in column 303B of database 303 that has not been marked as unresponsive in column 303D of database 303, even though it had previously been marked "Don't Try." Name Server 305C satisfies these rules, because while Name Server 305C has been marked as "don't try," it has not been marked as "unresponsive." Thus, DNS Resolver 302 will forward the DNS Request to Name Server 305C as DNS request 309D-1.

In other embodiments of FIG. 3D, however, DNS Resolver 302 finds the name server which has the highest affinity in column 303B of database 303, regardless of whether the name server has been marked unresponsive in column 303D of database 303. In these embodiments, Name Server 305A would satisfy this rule because its affinity in column 303B is 100. Thus, in this embodiment, DNS Resolver 302 will forward the DNS Request to Name Server 305A as DNS request 309D-2.

Following the process displayed in FIG. 3D, if DNS Resolver 302 is still unable to receive a resolution from a name server, DNS Resolver 302 may attempt to contact each name server in order of affinity, without regard to the service provider that operates or is associated with it and/or whether the name server has been marked as "don't try."

Figure 4A:
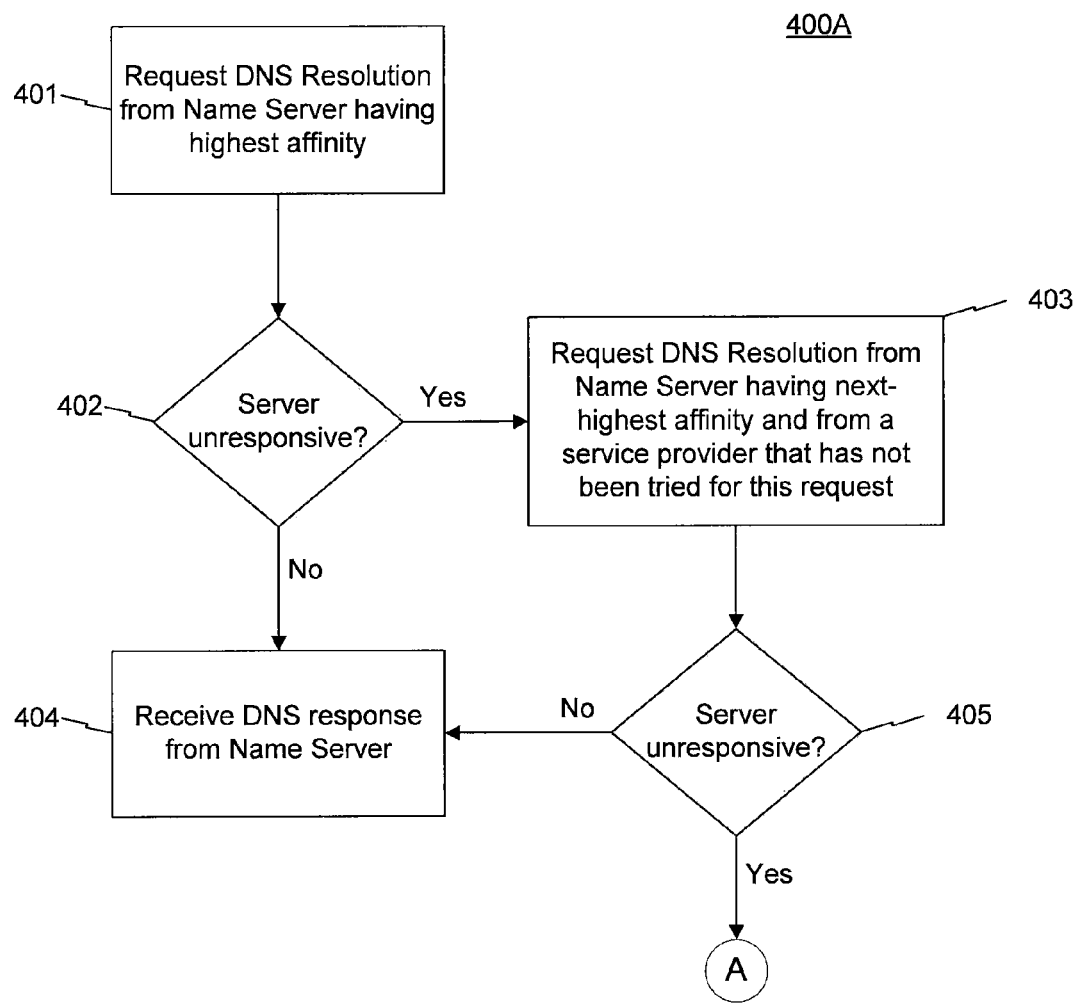
FIG. 4A shows an example portion of a method of making a DNS request, consistent with embodiments disclosed herein.

FIG. 4A shows an exemplary portion of a method 400A of requesting a DNS resolution consistent with disclosed embodiments. In block 401, User Device 101 and/or DNS Resolver 102 may request a DNS resolution from a name server associated with a first service provider having the highest affinity with User Device 101 and/or DNS Resolver 102.

In block 402 of FIG. 4, a determination is made as to whether the name server is unresponsive. Whether a server is unresponsive is based on a number of factors, including those previously described. If the name server responds in a timely manner, for example, the method may continue to block 404. At block 404, User Device 101 and/or DNS Resolver 102 will receive the DNS resolution from a name server.

On the other hand, if the name server is determined to be unresponsive, then User Device 101 and/or DNS Resolver 102 may proceed to block 403 and generate a new DNS Resolution for the same domain name. User Device 101 and/or DNS Resolver 102 may send the new request to a second server operated by a second service provider (separate from the first service provider) and having the next-highest affinity with User Device 101 and/or DNS Resolver 102.

In block 405, it is determined whether the second server from the second service provider is responsive. If the new server is responsive, then User Device 101 and/or DNS Resolver 102 receives a DNS Response from the new server, as in block 404. However, if the new server is also unresponsive, User Device 101 and/or DNS Resolver 102 may proceed to FIG. 4B for further processing.

Figure 4B:
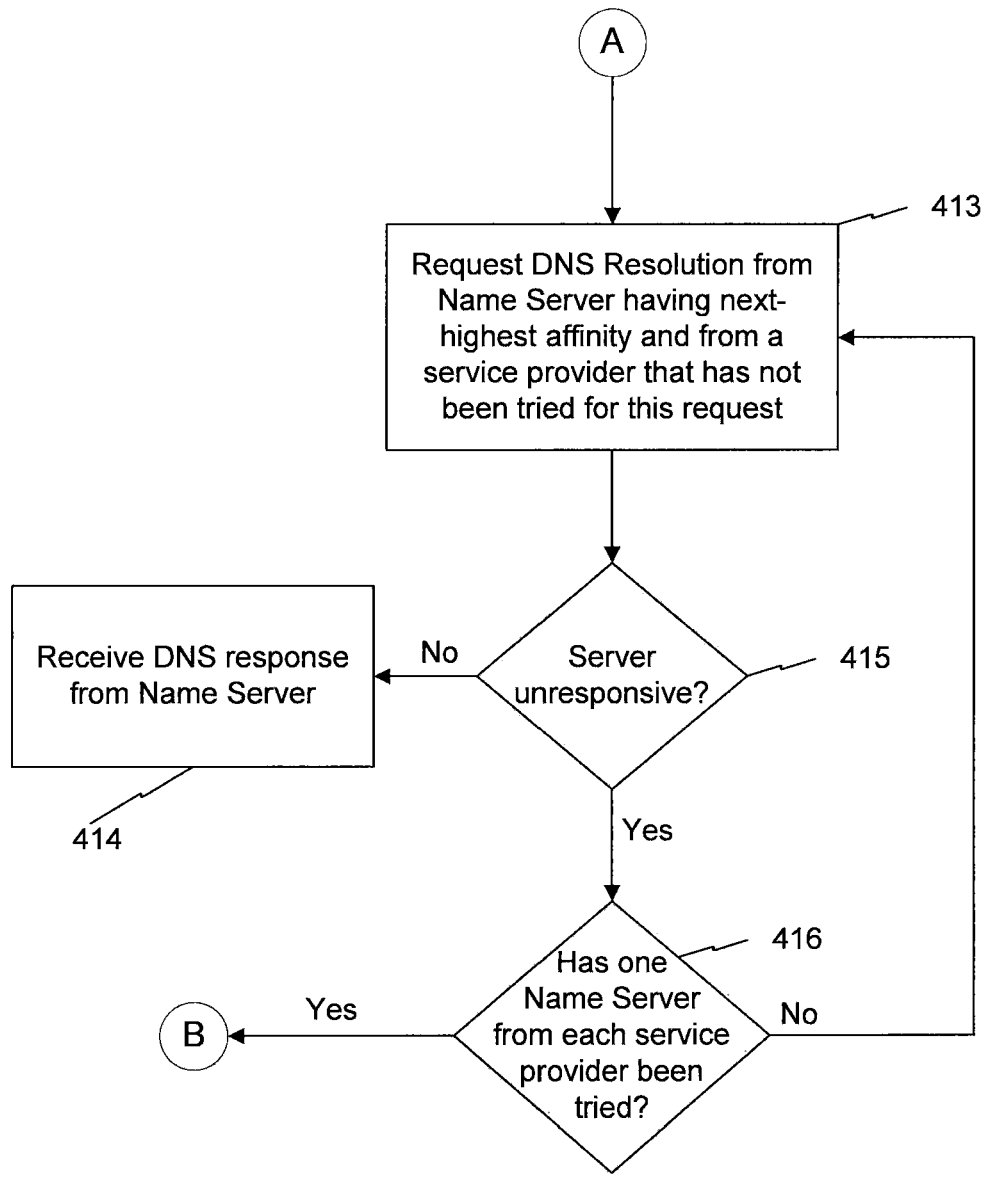
FIG. 4B shows an example portion of a method of making a DNS request, consistent with embodiments disclosed herein.

FIG. 4B shows an exemplary portion of a method 400B of requesting a DNS resolution consistent with disclosed embodiments. User Device 101 and/or DNS Resolver 102 may proceed to block 413 and generate another new DNS Resolution for the same domain name. User Device 101 and/or DNS Resolver 102 may then send that new request to another new server operated by another new service provider having the next-highest affinity with User Device 101 and/or DNS Resolver 102. This name server must also not be the same service provider associated with the name servers that have been previously determined to be unresponsive.

In block 415, it is determined whether the second server from the second service provider is responsive. If the new server is responsive, then User Device 101 and/or DNS Resolver 102 receives a DNS Response from the new server, as in block 414. But if the new server is also unresponsive, User Device 101 and/or DNS Resolver 102 may proceed to block 416 to determine whether one name server for each service provider has been contacted. If not, the method proceeds back to block 413 to generate another new DNS Resolution for the same domain name. Otherwise, if one name server for each service provider has been contacted and none of those servers have been responsive, the method may continue to FIG. 4C for further processing.

Figure 4C:
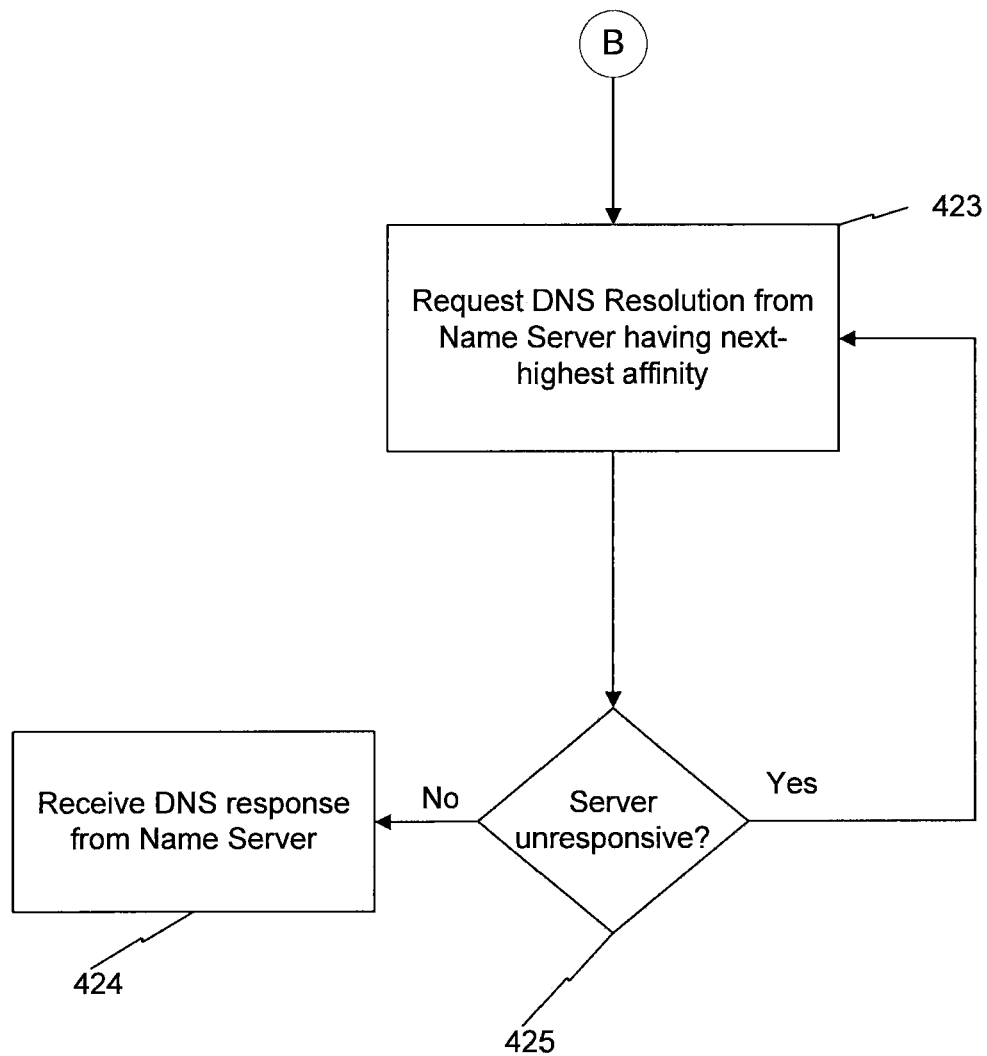
FIG. 4C shows an example portion of a method of making a DNS request, consistent with embodiments disclosed herein.

FIG. 4C shows an exemplary portion of a method 400C of requesting a DNS resolution consistent with disclosed embodiments. In some embodiments, User Device 101 and/or DNS Resolver 102 may continue to block 423 in FIG. 4C if one name server for each service provider has been contacted and found unresponsive. User Device 101 and/or DNS Resolver 102 may, in this block, determine a new name server purely based on affinity, without taking into account the service provider that operates or is associated with the name server. In other embodiments, however, User Device 101 and/or DNS Resolver 102 may determine a new name server based on one or more of the previously discussed criteria for choosing a name server. User Device 101 and/or DNS Resolver 102 may continue to block 425 to determine whether the new name server is unresponsive or not. If the new name server does respond (that is, for example, if the new name server returns a DNS response), then User Device 101 and/or DNS Resolver 102 may continue to block 424, i.e. receive a DNS Response.

If, however, the new name server is determined to be unresponsive, User Device 101 and/or DNS Resolver 102 may return to block 423 to determine a new name server from which to request a DNS resolution. This process may continue until a name server responds to the request, or until User Device 101 and/or DNS Resolver 102 give up on trying to contact a name server; that is, the request itself "times out."

Figure 5:
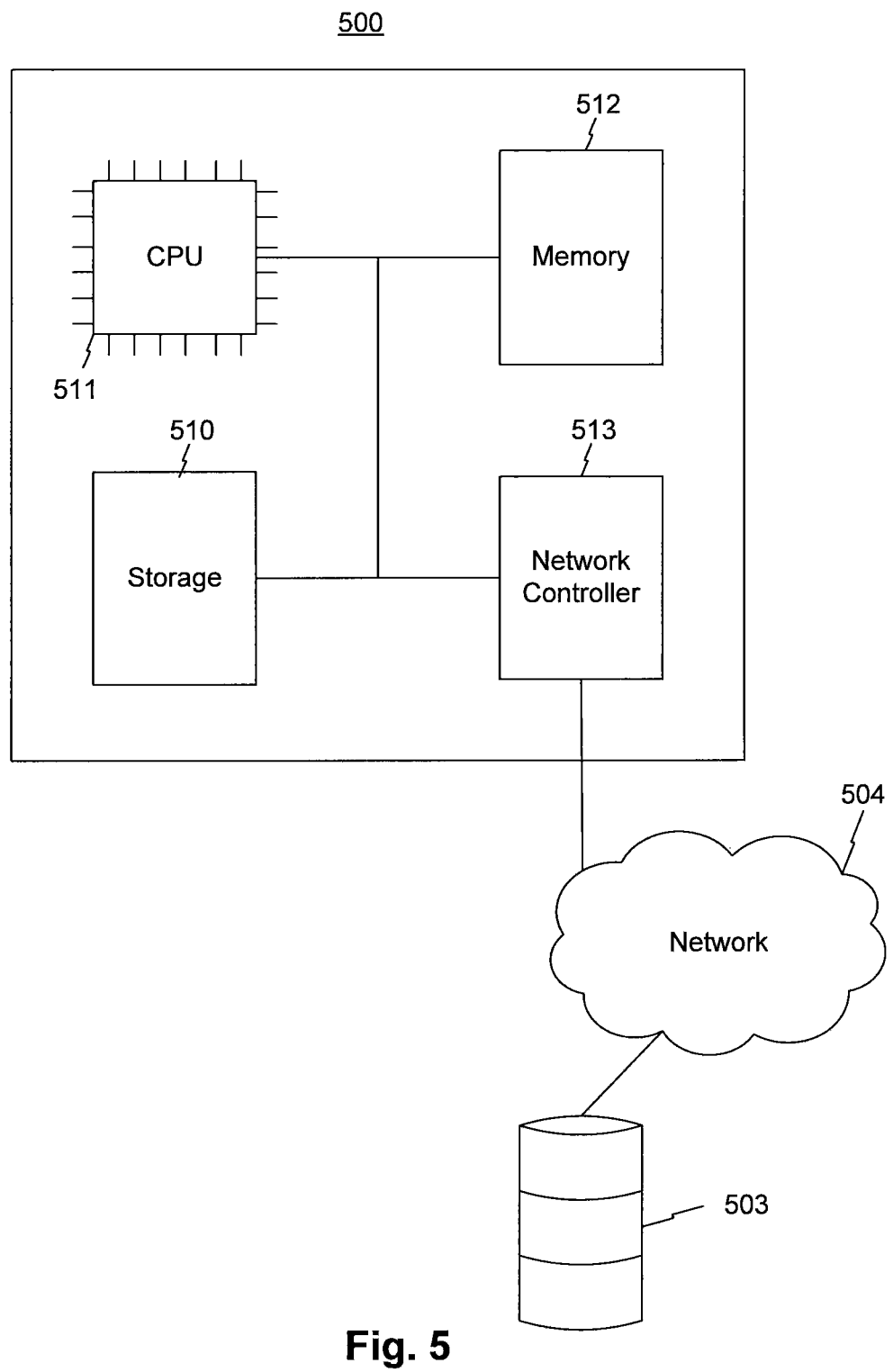
FIG. 5 shows an example of an electronic device, consistent with embodiments disclosed herein.

FIG. 5 shows an example of an electronic device 500 consistent with embodiments of the invention herein. Electronic Device 500 may be, for example, a personal computer, tablet PC, cellular telephone, Personal Digital Assistant (PDA), a server, or a similar type of computer or computer-based device. The devices described in this disclosure—such as User Device 101 and 301, DNS Resolver 102 and 302, Service Providers 105-107 and 305-307, and Authoritative Name Servers 105A-C, 106A-C, and 107A-C, 305A-C, 306A-C, 307A-D, and Database 303—may all be implemented at least partially as described in FIG. 5.

The components and arrangement disclosed in network layout 100, however, may vary. For example, each component may include storage 510, a CPU 511, a memory 512, and input/output (I/O) devices (including, for example, Network Controller 513). Further, each of these components may be implemented in various ways. For example, they may take the form of a general purpose computer, a server, a mainframe computer, or any combination of these components. In some embodiments, the components may include a cluster of servers capable of performing distributed data analysis, e.g., using Google's MapReduce™ framework. They may also be standalone, or form part of a subsystem, which may, in turn, be part of a larger system.

CPU 511 may include one or more known processing devices, such as a microprocessor from the Pentium™ or Xeon™ family manufactured by Intel™, the Turion™ family manufactured by AMD™, or any of various processors manufactured by Sun Microsystems. CPU 511, in some embodiments, may be a mobile processor, such as the Apple™ A5™ or A5X™, the Samsung™ Exynos™, or any of various mobile microprocessors manufactured by other manufacturers. Memory 512 may include one or more storage devices configured to store information used by CPU 511 to perform certain functions related to disclosed embodiments. Storage 510 may include a volatile or non-volatile, magnetic, semiconductor, tape, optical, removable, nonremovable, or other type of storage device or computer-readable medium.

In some embodiments, memory 512 may include one or more programs loaded from storage 510 or elsewhere that, when executed by the components, perform various procedures, operations, or processes consistent with disclosed embodiments. In one embodiment, memory associated with Electronic Device 500 may include a program that performs a method that comprises choosing a first server associated with and/or operated by a first service provider based on a first measurement associated with that first server. The method further comprises requesting first data from that first server, determining that the first server is unresponsive, and choosing a second server. The second server is chosen based on a second measurement, and chosen contingent on it being associated with and/or operated by a different service provider than that associated with the first server. The method further comprises requesting second data from the second server.

As discussed above, in some embodiments, the programs may include a cluster of servers capable of performing distributed data analysis. In these embodiments, such programs may support distributed computing frameworks, e.g., Google's MapReduce framework, etc.

Methods, systems, and articles of manufacture consistent with disclosed embodiments are not limited to separate programs or computers configured to perform dedicated tasks. Moreover, CPU 511 may execute one or more programs located remotely from the components employing CPU 511. For example, Electronic Device 500 may access one or more remote programs that, when executed, perform functions related to disclosed embodiments.

Memory 512 may be also be configured with an operating system (not shown) that performs several functions well known in the art when executed by CPU 511. By way of example, the operating system may be Microsoft Windows™, Unix™, Linux™, Solaris™, Apple™ iOS™, Google™ Android™, or some other operating system. The choice of operating system, and even the use of an operating system, is not critical to any embodiment.

Electronic Device 500 may include one or more I/O devices (such as Network Controller 513) that allow data to be received and/or transmitted over network 504. I/O devices may also include one or more digital and/or analog communication input/output devices that allow programs to communicate with other machines and devices. Electronic Device 500 may receive data from external machines and devices and output data to external machines and devices via I/O devices. The configuration and number of input and/or output devices incorporated in I/O devices may vary as appropriate for certain embodiments.

Electronic Device 500 may also be communicatively connected to one or more data repositories 503, e.g., through network 504. Data repository 503 may include one or more files or databases that store information and are accessed and/or managed through Electronic Device 500. By way of example, the databases may be Oracle™ databases, Sybase™ databases or other relational databases, or non-relational databases, such as Hadoop sequence files, HBase or Cassandra. The databases or other files may include, for example, embodiments of database 303 in FIG. 3, etc. Systems and methods of disclosed embodiments, however, are not limited to separate databases.

Use of the indefinite article "a" or "an" in the specification and the claims is meant to include one or more than one of the feature that it introduces, unless otherwise indicated.

Other embodiments will be apparent to those skilled in the art from consideration of the specification and practice disclosed herein. It is intended that the specification and examples be considered as examples only, with a true scope and spirit being indicated by the following claims.

What is claimed is:

1. A method for obtaining data from a plurality of servers associated with service providers, comprising:
    choosing, by one or more processors, a first server associated with a first service provider, based on a first measurement associated with the first server;
    requesting first data from the first server;
    determining that the first server is unresponsive;
    choosing, by the one or more processors and based on the determination that the first server is unresponsive, a second server based on a second measurement associated with the second server, the second server being associated with a second service provider different from the first service provider; and
    requesting the first data from the second server.

2. The method of claim 1, further comprising determining whether the first server and second server are associated with the same service provider based on at least one of:
    an indication of an association between the first server and the second server;
    an indication that the first server and second server are operated by the same service provider; or
    a determination that the first server and second server share at least one of a domain, top-level domain (TLD), domain and TLD, or business association.

3. The method of claim 1, further comprising determining that the first server is unresponsive based at least on a determination that:
    the first server failed to respond to a request within a predetermined amount of time;
    the first server is unreachable; and/or
    the first server may be experiencing a problem affecting performance.

4. The method of claim 1, wherein the first and second measurements include affinity measurements based on at least one of geographic location, historical data, statistics, round-trip time, bandwidth, or time between request and response.

5. The method of claim 1, further comprising:
    determining that the second server is unresponsive;
    determining that all of the service providers have at least one associated server that is unresponsive; and
    choosing a third server, based on a third measurement associated with the third server.

6. The method of claim 5, wherein the first, second, and third measurements include at least affinity measurements based on at least one of geographic location, historical data, statistics, round-trip time, bandwidth, or time between request and response.

7. The method of claim 5, wherein the third server is one of:
a server having a highest third measurement among the plurality of servers; or
a server, that has not been determined to be unresponsive, having the highest third measurement among the plurality of servers.

8. The method of claim 1, wherein:
the first and second data comprise DNS resolutions, and
the first and second servers are authoritative name servers.

9. An electronic device for obtaining data from a plurality of servers associated with service providers, the electronic device comprising:
a memory; and
a processor configured to:
choose a first server associated with a first service provider, based on a first measurement stored in the memory and associated with the first server;
request first data from the first server;
determine that the first server is unresponsive;
choose a second server based on a second measurement stored in the memory and associated with the second server, the second server being associated with a second service provider different from the first service provider; and
request the first data from the second server.

10. The electronic device of claim 9, wherein the processor is further configured to determine whether the first server and second server are associated with the same service provider based on at least one of:
an indication of an association between the first server and the second server;
an indication that the first server and second server are operated by the same service provider; or
a determination that the first server and second server are determined by the processor share at least one of a domain, top-level domain (TLD), domain and TLD, or business association.

11. The electronic device of claim 9, wherein the processor is further configured to determine that the first server is unresponsive based at least on a determination that at least one of:
the first server failed to respond to a request within a predetermined amount of time;
the first server is unreachable; and/or
the first server may be experiencing a problem affecting performance.

12. The electronic device of claim 9, wherein the first and second measurements include affinity measurements based on at least one of geographic location, historical data, statistics, round-trip time, bandwidth, or time between request and response.

13. The electronic device of claim 9, wherein the processor is further configured to:
determine that the second server is unresponsive;
determine that all of the service providers have at least one associated server that is unresponsive; and
choose a third server based on a third measurement stored in the memory and associated with the third server.

14. The electronic device of claim 13, wherein the first, second, and third measurements include at least affinity measurements based on at least one of geographic location, historical data, statistics, round-trip time, bandwidth, or time between request and response.

15. The electronic device of claim 14, wherein the processor is further configured to choose as the third server:
a server having a highest third measurement among the plurality of servers; or
a server, that has not been determined to be unresponsive, having the highest third measurement among the plurality of servers.

16. The electronic device of claim 9, wherein:
the first and second data comprise DNS resolutions, and
the processor is further configured to request the first data from a first authoritative name server and a second authoritative name server.

17. A non-transitory computer-readable medium having stored thereon executable instructions that, when executed by at least one processor, cause the at least one processor to perform a method comprising:
choosing a first server associated with a first service provider, based on a first measurement associated with the first server;
requesting first data from the first server;
determining that the first server is unresponsive;
choosing a second server based on a second measurement associated with the second server, the second server being associated with a second service provider different from the first service provider; and
requesting the first data from the second server.

18. The computer-readable medium of claim 17, wherein the instructions, when executed by the at least one processor, further cause the at least one processor to determine whether the first server and second server are associated with the same service provider based on at least one of:
an indication of an association between the first server and the second server;
an indication that the first server and second server are operated by the same service provider; or
a determination that the first server and second server share at least one of a domain, top-level domain (TLD), domain and TLD, or business association.

19. The computer-readable medium of claim 17, wherein the instructions, when executed by the at least one processor, further cause the at least one processor to:
determine that the second server is unresponsive;
determine that all of the service providers have at least one associated server that is unresponsive; and
choose a third server, based on a third measurement associated with the third server.

20. The computer-readable medium of claim 17, wherein the instructions, when executed by the at least one processor, further cause the at least one processor to:
request the first data from a first authoritative name server and a second authoritative name server;
wherein the first data comprises a DNS resolution.

* * * * *